F. A. RICHARDSON.
APPARATUS FOR DETERMINING THE POSITION OF MACHINE TOOLS.
APPLICATION FILED APR. 20, 1920.

1,404,545.

Patented Jan. 24, 1922.

INVENTOR
FRANCIS A. RICHARDSON
BY
Bradley L. Benson
ATTORNEY

UNITED STATES PATENT OFFICE.

FRANCIS A. RICHARDSON, OF SAN FRANCISCO, CALIFORNIA.

APPARATUS FOR DETERMINING THE POSITION OF MACHINE TOOLS.

1,404,545.  Specification of Letters Patent.  Patented Jan. 24, 1922.

Application filed April 20, 1920. Serial No. 375,257.

*To all whom it may concern:*

Be it known that I, FRANCIS A. RICHARDSON, a citizen of the United States, residing at San Francisco, in the county of San Francisco and State of California, have invented certain new and useful Improvements in Apparatus for Determining the Position of Machine Tools, of which the following is a specification.

The present invention is an apparatus for guiding lathe and other machine tools.

The primary object of the invention is to provide a semi-automatic means for determining the position of a cutting tool to facilitate the production or reproduction of a piece of work from a plan or model from a finished article.

Another object of the invention is to provide in connection with a tool a telltale means whereby an operator can follow a chart, diagram, or blue print, or any suitable configuration, and thereby determine the position of the cutting tool.

Another object of the invention is to provide a guide in fixed relation to the working tool, and to connect the work and the tool electrically, and to provide means on said electric connection for operating a signal, either audible or visible to the operator.

By means of the hereinafter described invention, the operator can adjust the cutting tool to a piece of work and move said tool forward into the work without danger of cutting too deeply into the work, because of the fact that when the desired depth is reached the electric circuit is closed and the signal becomes effective.

While the invention is here shown in connection with a lathe, it is obvious that it is applicable to other types of power operated tools, such as drill presses and the like, and will result in a great saving in cost of machine production.

In this specification and the annexed drawings, the invention is illustrated in the form considered to be the best, but it is to be understood that the invention is not limited to such form, because it may be embodied in other forms.

In the accompanying one sheet of drawing:—

Figure 1:
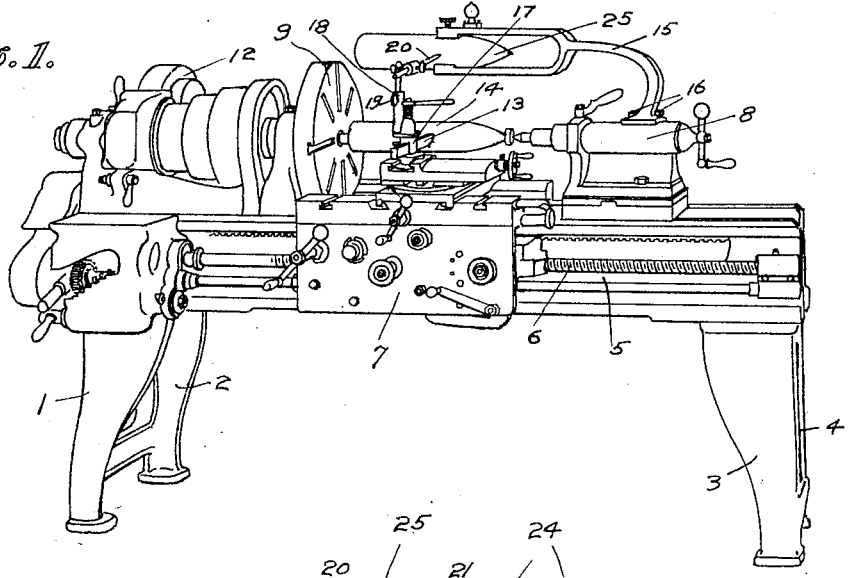
Figure 1 is a perspective view of a lathe of conventional type showing my invention installed thereon, and illustrating diagrammatically the wiring of the electric signal.
Figure 2:
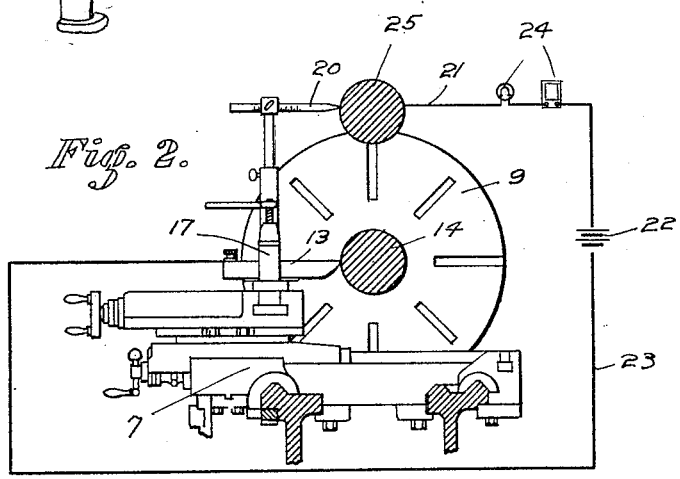
Figure 2 is a central vertical cross section of Figure 1.

Referring now to Figure 1, the numerals 1, 2, 3 and 4 indicate the legs which support the bed 5 of a lathe. The bed carries the feed screw 6 which moves the carriage 7 back and forth between the tailstock 8 and face plate chuck 9. The face plate chuck 9 is driven by the usual belt-cone and back gears, 12. The construction so far described is standard and in use, and no claim is made to any novelty therein.

The carriage 7 is provided with the usual adjustment means, such as cross feed, for moving a tool 13 into position against work being revolved in the lathe.

As shown at 14, I have shown a piece of stock to be revolved in the lathe. The numeral 15 designates a bracket suitably secured as by screws 16 to the tailstock 8. The bracket 15 is adapted to engage and securely hold a model, plan or piece of finished work which it is desired to duplicate on the lathe below. Obviously the bracket 15 might be in various positions, but is here shown above the lathe for accessibility and to prevent the waste material from the lathe from dropping on the pattern or plan.

Secured to the cutting tool post 17 and rotatable and otherwise adjustable thereon is a bracket arm 18, which may be held at any desired angle by a set screw 19. The end of the bracket arm 18 remote from the tool post is provided with a bore adapted to slidably receive a finger 20 adapted to contact with the pattern 25.

This finger may be of any suitable shape or material, as, for instance, a point of ivory or hard rubber for tracing a blue print or flat plan, or it may be made of metal which will conduct electricity and close a circuit when in contact with a metal model 25.

It will be seen that my invention resides in the use of a finger or guide adapted to be placed in fixed relation to the working tool, and thus permit the operator to follow a desired contour without the necessity of calipering the work at frequent intervals.

As an additional convenience, I provide electrical means for preventing the operator from cutting too deeply. A wire 21 is connected at one end with the metallic pattern 25, and at the opposite end to one pole of a battery cell 22. To the other pole of said battery is secured one end of a wire 23, the opposite end of which is secured to the tool 13. A pilot light 24 is interposed on the wire 21 or an annunciator if desired to announce to the lathe operator the fact that the finger 20 has contacted with the metal pattern 18, and consequently the cut made by the tool is deep enough.

Having thus described my invention what I claim as new and desire to secure by Letters Patent of the United States is as follows:—

1. An apparatus for producing machine tool work from stock material, comprising, in combination, means for supporting a body of stock, a tool adapted to act upon said stock, means for supporting a pattern in fixed relation to said stock, a finger normally out of engagement with said pattern, but adapted to contact the same when the tool reaches the permissible limit of its action upon said stock.

2. An apparatus for producing machine tool work from stock material, comprising, in combination, means for supporting a body of stock, a tool adapted to act upon said stock, means for supporting a pattern in fixed relation to said stock, a finger connected to said tool, and moving therewith, said finger normally out of contact with said pattern, but adapted to engage the same when the tool reaches its permissible limit, and thereby stop the action of the tool upon said stock.

3. A telltale for a machine tool comprising a finger in fixed relation to said tool and movable therewith, a pattern in fixed relation to said machine, and electrical means connecting said pattern and said tool adapted to operate a signal.

4. A telltale for a machine tool comprising a finger in fixed relation to said tool, movable therewith, a pattern in fixed relation to said machine, and electrical means connecting said pattern and said tool adapted to operate a visible signal.

5. In a lathe having a tailstock, carriage, tool, and tool post, a bracket carried by said tailstock and adapted to removably engage a pattern, a bracket removably secured to said tool post and provided with means for holding a finger in fixed relation to said tool.

6. A telltale for a machine tool comprising a suitable point of contact in fixed relation to said tool and movable therewith, a pattern of material adapted to conduct electrical current, electrical means connecting said pattern and said tool adapted to operate a signal when said point contacts with said pattern.

In testimony whereof I affix my signature.

FRANCIS A. RICHARDSON.